United States Patent
Deshpande et al.

(10) Patent No.: US 10,525,881 B1
(45) Date of Patent: Jan. 7, 2020

(54) WHEEL ORIENTATION WARNING SYSTEM

(71) Applicant: Robert Bosch GmbH, Stuttgart (DE)

(72) Inventors: Anup S Deshpande, Troy, MI (US); Troy Austin McCormick, Milford, MI (US); Al-Laith Taha, Windsor (CA)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/271,439

(22) Filed: Feb. 8, 2019

Related U.S. Application Data

(60) Provisional application No. 62/783,457, filed on Dec. 21, 2018.

(51) Int. Cl.
*B60Q 9/00* (2006.01)

(52) U.S. Cl.
CPC ............ *B60Q 9/002* (2013.01); *B60Q 9/001* (2013.01)

(58) Field of Classification Search
CPC .. B62D 6/001; B62D 15/027; B62D 15/0285; G08G 1/168; B60Q 9/005; B60Q 9/00; B60Q 9/001
See application file for complete search history.

(56) References Cited

U.S. PATENT DOCUMENTS

| | | | | |
|---|---|---|---|---|
| 7,378,988 | B2* | 5/2008 | Nordbruch | B60Q 9/00 180/282 |
| 7,894,951 | B2* | 2/2011 | Norris | H04L 67/12 180/443 |
| 8,666,601 | B1* | 3/2014 | Van Wiemeersch | B62D 15/0285 701/41 |
| 8,849,518 | B2* | 9/2014 | Nefcy | G08G 1/168 701/36 |
| 9,114,834 | B2* | 8/2015 | Hauber | B62D 15/027 |
| 9,592,798 | B2 | 3/2017 | Lee | |
| 10,046,804 | B2* | 8/2018 | Fendt | B62D 15/027 |
| 2003/0058337 | A1* | 3/2003 | Tanaka | B60Q 9/005 348/116 |
| 2007/0198145 | A1* | 8/2007 | Norris | B60T 7/22 701/23 |
| 2011/0199236 | A1* | 8/2011 | Hauber | B62D 15/027 340/932.2 |
| 2011/0276225 | A1* | 11/2011 | Nefcy | B62D 15/027 701/41 |
| 2016/0121888 | A1* | 5/2016 | Choi | B60W 40/072 701/1 |
| 2016/0207528 | A1 | 7/2016 | Stefan et al. | |
| 2017/0129536 | A1* | 5/2017 | Xu | B62D 6/001 |

(Continued)

*Primary Examiner* — Hoi C Lau
(74) *Attorney, Agent, or Firm* — Michael Best & Friedrich LLP

(57) ABSTRACT

A wheel orientation warning system and method to alert to a driver to turn front wheels toward a curb includes an electronic processor and a memory. The system includes a slope detector for detecting a slope of the vehicle and an arrangement for determining a presence of a curb adjacent a side of the vehicle. The system includes a transmission device for detecting when the vehicle is in a park mode. The electronic processor is configured to provide an alert to a driver to turn front wheels toward the curb when the vehicle is each of: disposed at a slope with an absolute value greater than a predetermined threshold, disposed adjacent the curb, and in the park mode. The system includes a dashboard display for providing messages and an indication to a driver when the wheels are turned toward the curb.

19 Claims, 5 Drawing Sheets

(56) References Cited

U.S. PATENT DOCUMENTS

2018/0244283 A1 8/2018 GeiEnhoner et al.
2018/0301031 A1 10/2018 Naamani et al.

* cited by examiner

WHEEL ORIENTATION WARNING SYSTEM

RELATED APPLICATIONS

This application claims priority to U.S. provisional application 62/783,457 filed Dec. 21, 2018, the disclosure of which is incorporated by reference herein.

BACKGROUND

The embodiments relate to a warning system for wheel orientation of a vehicle when parked.

The concept of controlling wheel orientation is known. U.S. Pat. Pub. 2017/0129536 discloses a hill parking aid that controls the steering system to automatically adjust vehicle front wheels toward the curb when a front of the vehicle faces downhill so that the curb prevents rolling. When facing uphill the steering system also adjusts the front wheels so the curb prevents the vehicle from rolling down the roadway. The arrangement operates automatically without driver operation.

SUMMARY

A method of informing a driver of a hill and providing a reminder to turn the steering wheel to move the front wheels to a position to minimize rolling of a vehicle is advantageous.

In one embodiment, a method for providing an alert to turn front wheels toward a curb while parking on a slope, includes determining that a vehicle is on a slope; determining presence of a curb adjacent a side of the vehicle; and determining that the vehicle is in park mode. Thereafter, the method provides an alert to a driver to turn front wheels toward the curb when the vehicle is on a slope, adjacent the curb, and in the park mode. Turning the wheels toward the curb prevents the vehicle from rolling into roadway if inadvertently placed in neutral and/or the parking brake is not set.

Another embodiment includes a wheel orientation warning system for determining when to provide an alert to a driver of a vehicle to turn front wheels toward a curb. The warning system includes an electronic processor and a memory, a slope detector for detecting a slope of the vehicle, means for determining a presence of a curb adjacent a side of the vehicle, and a transmission device for detecting when the vehicle is in a park mode. The electronic processor is configured to provide an alert to a driver to turn front wheels toward the curb when the vehicle is: at a slope with an absolute value greater than a predetermined threshold, disposed adjacent the curb, and in the park mode.

Other aspects of the invention will become apparent by consideration of the detailed description and accompanying drawings.

DETAILED DESCRIPTION

Before any embodiments of the arrangements are explained in detail, it is to be understood that the arrangement is not limited in its application to the details of construction and the arrangement of components set forth in the following description or illustrated in the following drawings. The arrangement is capable of other embodiments and of being practiced or of being carried out in various ways.

Figure 1:
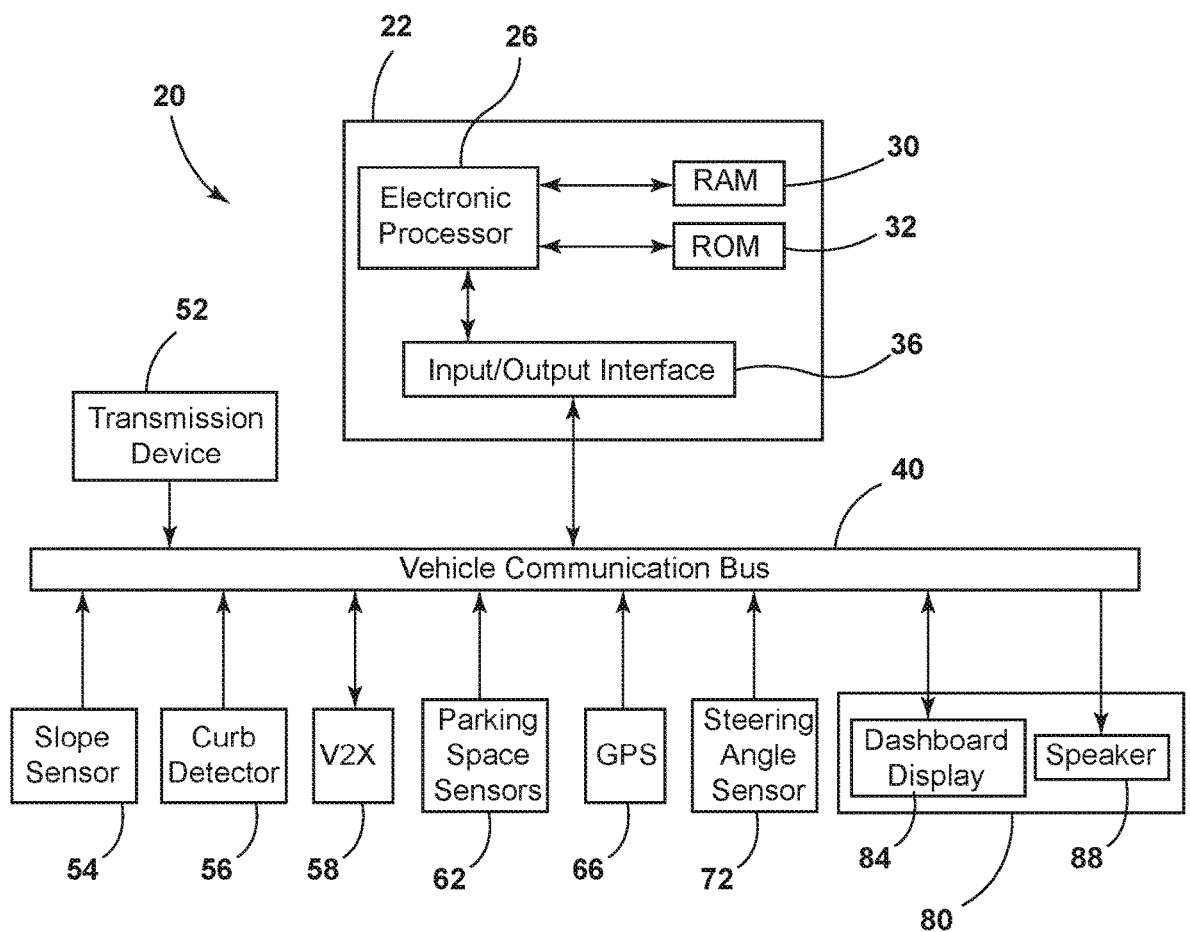
FIG. 1 is a block diagram of a wheel orientation warning system, according to some embodiments.

FIG. 1 illustrates a wheel orientation warning system 20 for a vehicle, such as a four-wheeled car or truck or the like. A driver assistance unit 22 ("DAU") analyzes vehicle information such as vehicle position disposed uphill or downhill, along with presence of a curb, and controls a vehicle display or other features based on the received data. The DAU 22 includes an electronic processor 26 and one or more non-transitory, computer-readable memory modules. In the example of FIG. 1, the DAU 22 includes a random access memory ("RAM") module 30 and a read-only memory ("ROM") module 32. The DAU 22 also includes an input/output interface 36 that transmits and receives data over a vehicle communication bus 40. The vehicle communication bus 40 can be a controller area network ("CAN") bus, a CAN-FD (flexible data-rate) bus, a FlexRay bus or the like. The DAU 22 can include multiple processors, additional computer-readable memory modules, multiple I/O interfaces, and/or additional components or modules (e.g., hardware, software, or a combination thereof). In one embodiment, the DAU 22 includes a park pilot control unit. In another embodiment, the DAU 22 includes a vision system.

The electronic processor 26 of the DAU 22 receives information from the I/O interface 36 and processes the information by executing instructions for one or more software modules (which may also be referred to as a "controller" or "controllers") stored to a memory module, such as the ROM 32. The electronic processor 26 stores information to and retrieves information from the RAM 30 (e.g., information received from other vehicle subsystems or sensors through the vehicle communication bus 40 and information generated by modules executed by the electronic processor 26). The non-transitory computer readable memory modules of the DAU 22 include volatile memory, non-volatile memory, or a combination thereof and, in various constructions, may also store operating system software, applications/instructions data, and combinations thereof.

Various other vehicle subsystems, are also connected to the vehicle communication bus 40 to communicate with the DAU 22, including various vehicle sensors, and the other vehicle subsystems. For example, a transmission device 52 senses a transmission mode, such as a park mode of the vehicle and provides that vehicle operating mode data to the vehicle communication bus 40. A slope detector 54, such as an accelerometer, tilt sensor, or other sensor arrangement, determines the slope of the vehicle with respect to gravity when parked in a downhill or uphill orientation, as well as a generally level orientation. In one embodiment, a curb detector 56, such as a group of vision or camera sensors disposed on opposing sides and/or surrounding the vehicle, detects the presence of a curb adjacent either side of the vehicle. In another embodiment, the curb detector 56 includes ultrasonic sensors disposed on opposing sides or surrounding the vehicle.

An optional V2X transceiver 58 provides vehicle-to-anything communication with a cloud via cellular tower, and with other vehicles in some embodiments. In one embodiment, the V2X transceiver 58 searches and selects from WIFI networks, cellular networks, dedicated short-range communication (DSRC), and an intelligent transportation system (ITS) for fifth generation 5G communication ITS-5G.

FIG. 1 shows an optional parking space sensor device 62, such as ultrasonic sensors disposed on opposing sides of the vehicle, that sense the presence of vehicles adjacent the vehicle. A global positioning signal (GPS_receiver 66 is provided for determining a position of the vehicle. The GPS receiver 66 includes hardware and software for locating the vehicle using GPS signals.

Further, FIG. 1 shows a steering angle sensor 72 or other arrangement that determines the steering wheel orientation for the front wheels of the vehicle and supplies same to the electronic processor 26 via the vehicle communication bus 40. Various types of sensors and other arrangements are known for determining steering wheel angle for the front wheels.

Finally, FIG. 1 shows a human machine interface 80 that includes a dashboard display 84 and a vehicle interior loudspeaker 88. In some embodiments, the human machine interface 80 may include a touchscreen. The dashboard display may include OLED, LCD, LED and other display light sources.

Each of these vehicle sub-systems, sensors, or arrangements shown in FIG. 1 is connected to the vehicle communication bus 40 and is capable of exchanging information with other vehicle devices, sub-systems, sensors, or arrangements connected to the vehicle communication bus 40. Other devices (not shown) are also connected to the vehicle communication bus 40.

Figure 2:
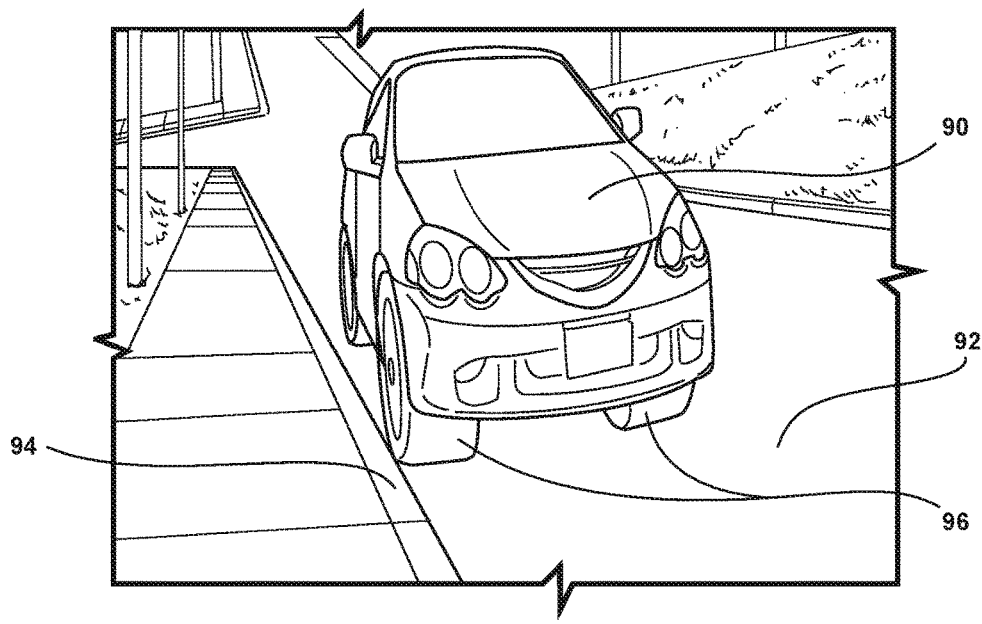
FIG. 2 shows is perspective view of a vehicle parked uphill adjacent to a curb.

FIG. 2 shows a vehicle 90 located on a road 92. The vehicle 90 has right side wheels adjacent to a curb 94. The front wheels 96 are oriented in a straight direction.

Front Wheel Warning Operation

Figure 3:
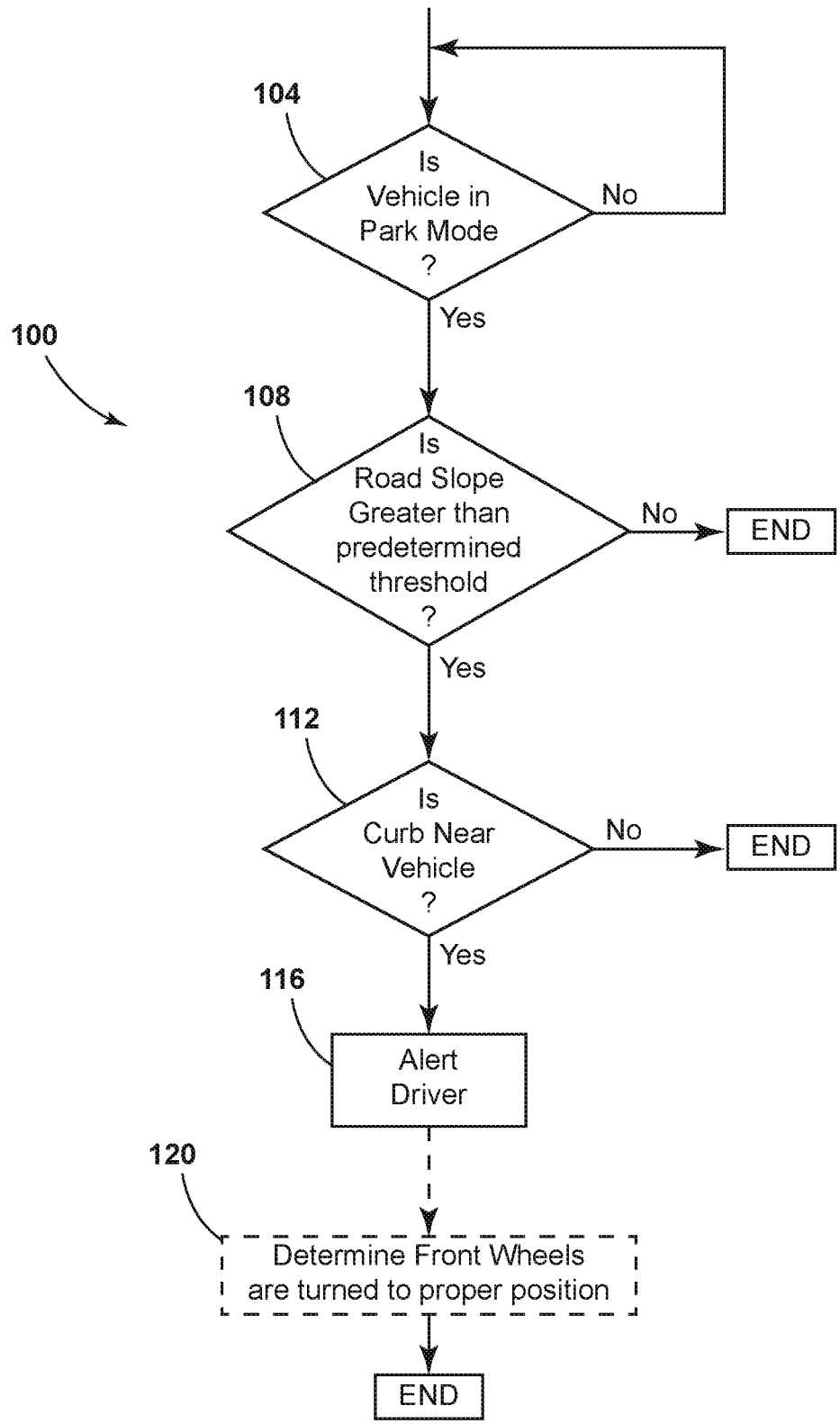
FIG. 3 is a flowchart of a wheel orientation warning system, according to some embodiments.

FIG. 3 is a flowchart showing operation of a DAU 22 in one embodiment for a wheel orientation warning system 20. In some embodiments, the wheel orientation warning system 20 does not include all of the components and devices illustrated in FIG. 1. The steps illustrated in the flowchart 100 shown in FIG. 3 can be provided in any order or sequence.

In operation, the electronic processor 26 executes a program that determines whether the vehicle is in a park mode shown at decision step 104 by obtaining the driving mode from the transmission device 52 via the communication bus 40. If in a different driving mode than Park mode, the electronic processor 26 returns to periodically repeat decision step 104. If the vehicle is in park mode, the electronic processor 26 advances to decision step 108.

At decision step 108, the electronic processor 26 compares an absolute value of road slope obtained from slope detector 54 and received over the communication bus 40 with a predetermined threshold. When the road is comparatively flat and less than the predetermined threshold, the operation is ended. In one embodiment, the predetermined threshold is 5%. Utilizing the absolute value of road slope accounts for downhill and uphill slopes when measuring and comparing the road slope to the predetermined threshold.

When the predetermined threshold is exceeded by the absolute value of the road slope at decision step 108, the electronic processor 26 advances to decision step 112. At decision step 112, the electronic processor 26 obtains a signal from a curb detector 56 and/or determines the presence of a curb from a GPS signal defining the location of the vehicle. The electronic processor 26 is configured for comparing the determined vehicle position to a cloud based map or a vehicle memory stored map to determine and show a presence or absence of a curb adjacent either side of the vehicle. When a curb is not present, the operation is ended.

Figure 4:
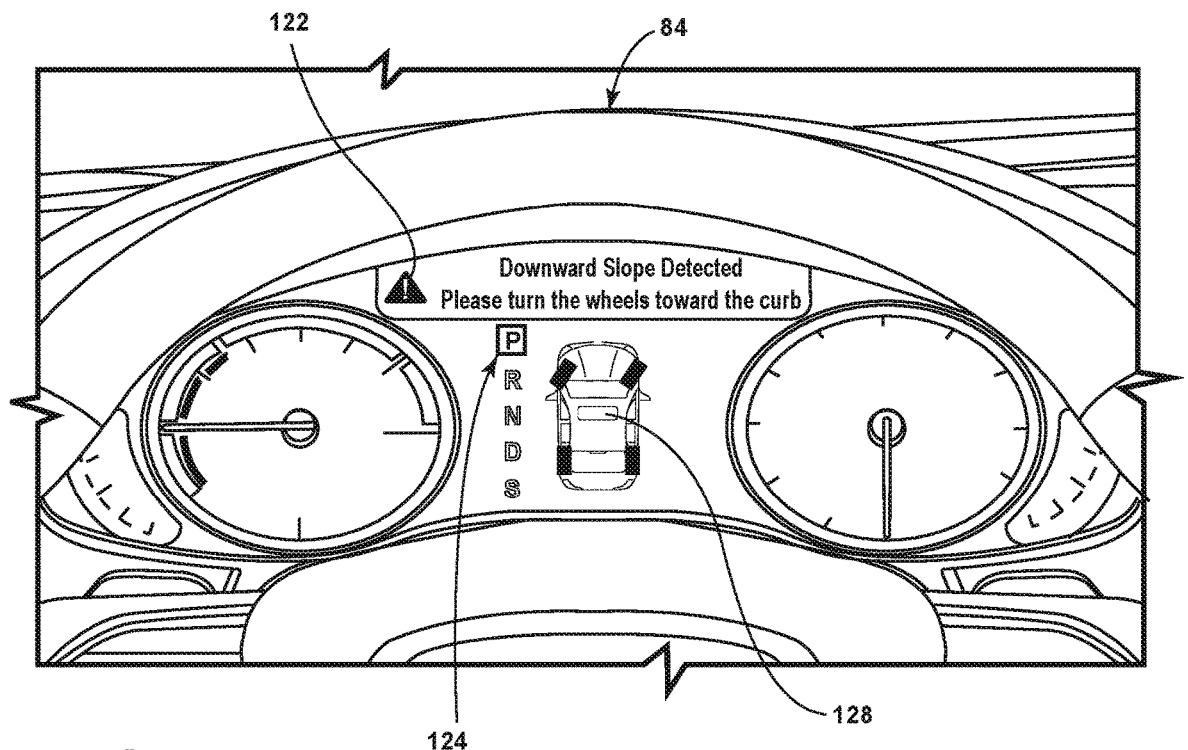
FIG. 4 is a front view of a portion of a dashboard of a vehicle, according to some embodiments.

When the curb is determined to be present at decision step 112, the electronic processor 26 advances to step 116 to alert a driver to turn the front steered wheels toward the curb whether facing uphill or downhill. More specifically, as shown in FIG. 4, an attention triangle 122 and a message "Downward Slope Detected—Please turn the wheels towards the curb" is provided on a section of the dashboard display 84. Further, in some embodiments, a simultaneous chime is provided or output by the vehicle interior loudspeaker 88 to alert a driver to look for a visual message on the dashboard display 84. In response to the prompts, a driver manually turns the front wheels toward the curb 94.

FIG. 4 also shows the dashboard display 84 displaying a Park Mode as shown by a box outline 124 encircling the letter "P." Displays for miles per hour and engine speed are also provided on the dashboard display 84. In the embodiment shown in FIG. 4, the dashboard display 84 includes indicia 128 showing the front wheels pointed toward the right. Thus, a driver can determine from the dashboard display 84 the direction of the front wheels and when the front wheels are properly aligned toward the curb 94.

In one embodiment, a steering angle for the front wheels of the vehicle 90 is provided on the dashboard display 84 as shown in FIG. 4. This embodiment includes the additional optional step 120 shown in broken line in FIG. 2. In step 120, the electronic processor receives the front wheel position from the steering angle sensor 72 for display on the dashboard display 84. Thus, a driver can receive an indication or otherwise determine when the front wheels are turned toward the curb a proper sufficient amount. Further, the loudspeaker 88 can provide an output when the front wheels are turned toward a curb a needed amount so that the curb and wheels prevent the vehicle from rolling uphill or downhill. Thereafter, a driver need not further turn the steering wheel.

Community Based Parking Embodiment

Figure 5:
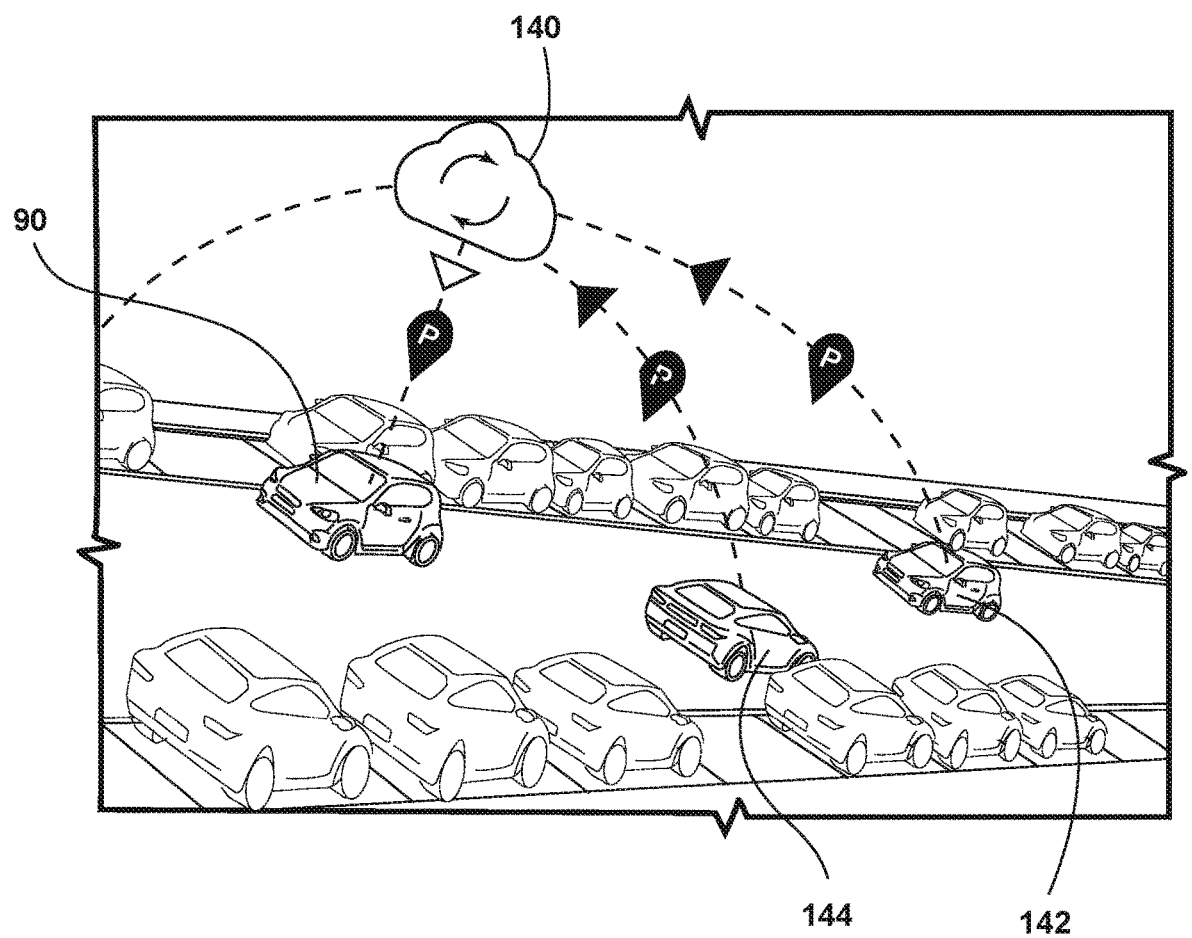
FIG. 5 is a diagram of a community based parking arrangement.

Another embodiment includes identifying open parking spaces for a driver of a vehicle. The vehicle 90 includes parking space sensors 62 disposed on both sides thereof. The parking space sensors 62 sense the presence or absence of vehicles adjacent respective sides of the vehicle while the global positioning signal GPS receiver 66 determines a position of the vehicle. The electronic processor 26 receives the vehicle position from the GPS receiver 66 over the vehicle communication bus 40, and the presence or absence of vehicles nearby from the parking space sensors 62. The presence or absence of available parking spaces is determined and transmitted via the V2X transceiver 58 to a community based cloud 140 and to other vehicles as shown in FIG. 5. Servers or other devices provided with the community based cloud 140 aggregate information from a plurality of vehicles and/or other data. Thus, the V2X transceiver 58 of the vehicle 90 indirectly receives parking information from transceivers in other vehicles, from the community based cloud, or elsewhere that is then provided to the electronic processor 26 via the vehicle communication bus 40. Therefore, open parking spaces in an area of the vehicle 90 can be provided to the vehicle driver.

In one embodiment, various other vehicles 142, 144 shown in FIG. 5 have parking space sensors and V2X transceivers to communicate with the community based cloud 140. The community based cloud 140 represents cellular towers or other communication arrangements and a cloud computing arrangement, such as at least one server, provided at a remote location for receiving incoming raw data from a plurality of vehicles or other arrangements, and for processing, aggregating, and sharing parking availability information with other community members as digital parking information (a parking area map or a parking prediction), via the dashboard display 84 or other display arrangements. Other information can be provided that is based on GPS data, including information regarding local parking regulations (whether local law requires turning the front wheels towards the curb) in a particular area, and additionally if a curb is historically known to be located at that location and side of the road.

Operation of Community Based Embodiment

Figure 6:
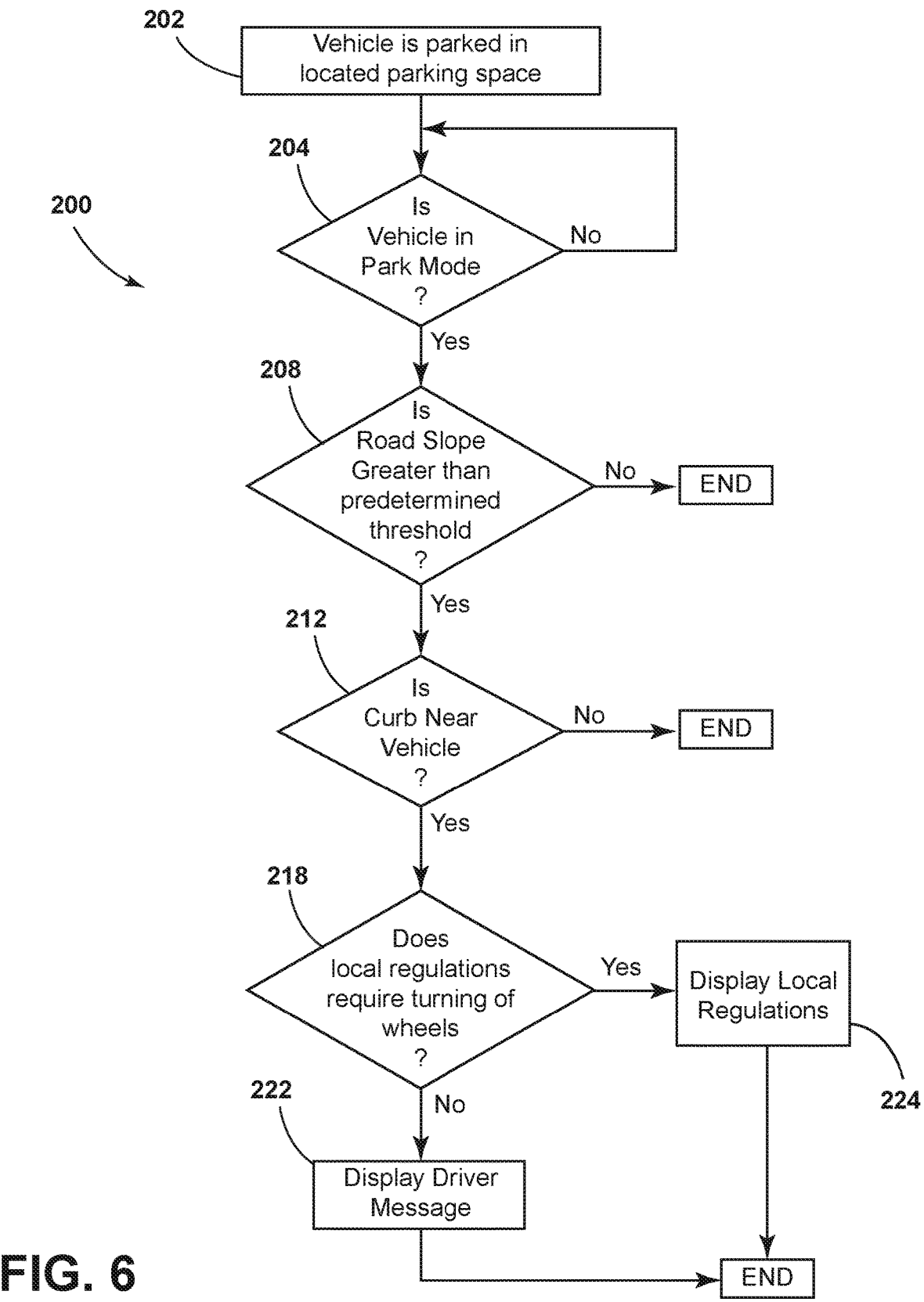
FIG. 6 is a flowchart illustrating another method of providing a wheel orientation warning, according to some embodiments.

FIG. 6 shows a flow chart 200 of operation of the community based embodiment. A vehicle 90 equipped with a GPS receiver 66, and a V2X transceiver 58 providing cloud connectivity (including access to digital parking information), navigates to a parking spot based on the parking space information received from the cloud 140 at step 202. The parking space information is used by a vehicle driver to find an available parking space in a nearby area. Thereafter, the electronic processor 26 detects whether the vehicle is in Park mode by receiving an output from the transmission device 52 over the vehicle communication bus 40 at decision step 204. When a Park mode is not detected (i.e. neutral, drive, low, or reverse mode is operating), the electronic processor 26 returns to decision step 204.

When a Park mode is determined at decision step 204, which indicates the vehicle 90 is parked, the electronic processor 26 advances to decision step 208. At decision step 208, the electronic processor 26 determines from the slope detector 54 or another arrangement, whether the road slope is greater than a predetermined threshold. If the road slop is not greater than the threshold, the operation ends.

When the road slope is greater than the predetermined threshold at decision step 208, the electronic processor 26 advances to decision step 212. At decision step 212, the electronic processor 26 obtains a signal from a curb detector 56 or determines the presence of a curb from a GPS 66 providing a signal defining the location of the vehicle and a cloud based or vehicle memory stored map showing a presence or absence of a curb adjacent an appropriate side of the vehicle. When a curb is not present, the operation is ended.

When the curb is present at decision step 212, the electronic processor 26 advances to decision step 218. At decision step 218, the electronic processor 26 determines whether local regulations for the local municipality require turning of front wheels into the curb. This information is obtained from the cloud 140 or is stored in vehicle memory 30, 32. When there are no local regulations at decision step 218, the electronic processor advances to step 222, which provides a message "Turn wheels into curb" on the dashboard display 84. In one embodiment, the loudspeaker 88 outputs a sound to get the attention of the driver so that the driver reads the message. Further, an attention triangle 122 is also provided.

Alternatively, when local regulations are discovered at decision step 218, the electronic processor 26 advances to step 224 and outputs the message "Turn wheels into curb as per local regulations." In some embodiments, a sound is provided by the loudspeaker 88 to get attention of the driver. Also an attention triangle 122 is also provided in one embodiment to get a driver to look at the dashboard display 84. Thus, this operation of parking a vehicle 90 warns a driver of the potential of a fine for improper parking on a sloped surface. As in the optional embodiment of FIG. 3, the arrangement of FIG. 6 can be modified to sense the steering angle of the front wheels and provide an acknowledgement when the front wheels are turned the necessary amount.

When the vehicle is parking on the left side of a one way street, of course the front wheels must be turned to the left. The message can be adjusted to inform the driver which way or direction to turn the front wheels, although a driver should know which way to turn the front wheels by observation alone.

In some embodiments, the electronic processor 26 receives the vehicle position from the GPS receiver over the vehicle communication bus 40, and the presence or absence of vehicles nearby from the parking space sensors 62. The information is transmitted via the V2X transceiver 58 to the cloud and other vehicles. Further, the V2X transceiver 58 receives parking information from transceivers in other vehicles, from the cloud, or elsewhere that is provided to the electronic processor 26 via the vehicle communication bus 40.

The V2X transceiver 58 shown in FIG. 1 includes hardware and software components that allow the V2X transceiver 58 to communicate wirelessly using one or more modalities from the group consisting of: cellular data, vehicle-to-everything (V2X) communications, and Wi-Fi. Other communication arrangements and protocols are also contemplated. The V2X transceiver 58 enables the electronic controller 42 to communicate with other systems using public data networks (e.g., the Internet).

The memory modules 30, 32 can include a program storage area (e.g., read only memory (ROM) 32 and a data storage area (e.g., random access memory (RAM) 30, and another non-transitory computer readable medium. The electronic processor 26 executes software stored in the memory 32. The software may include instructions and algorithms for performing methods as described herein.

The input/output interface 36 shown in FIG. 1 receives inputs and provides outputs to and from systems external to the DAU 22, including the devices and systems shown in FIG. 1. In some embodiments, the DAU 22 includes a plurality of electrical and electronic components that provide power, operational control, and protection to the components and modules within the electronic processor 26. It should be understood that the DAU 22 may include additional, fewer, or different components.

The DAU 22 includes the input/output interface 36 for sending and receiving information from one or more sensors or systems external to the electronic processor 26 over the vehicle communication bus 40. In some implementations, the wheel orientation warning system 20 can also include one or more additional internal sensors or systems.

In one embodiment, the predetermined threshold for the road slope is selected by an operator or a default threshold is provided by a manufacturer. In another instance, a road slope is determined from local parking regulations when Map/GPS data is available. When Map/GPS info is available, the slope threshold will be chosen as the lower of the preselected slope threshold and a slope threshold defined by the local regulations. For example, if the preselected threshold is 5% but local parking regulation requires drivers to turn their wheels into the curb above 4%, then the lower threshold of 4% will be automatically chosen for the operation shown in FIG. 3.

The wheel orientation warning system 20 is hosted in the driver assistance unit 22 as shown in FIG. 1. In other embodiments, the wheel orientation warning system 20 is hosted in a park pilot electronic control unit or vision electronic control unit.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "electronic processors" and "driver assistance units" described in the specification can include standard processing components, such as one or more processors, one or more memory modules including non-transitory computer-readable medium, one or more input/output interfaces, and various connections (e.g., a system bus) connecting the components.

Thus, the above arrangements provide, among other things, methods and systems for notifying a driver to ensure that front wheels are turned toward a curb when parking uphill or downhill adjacent the curb.

What is claimed is:

1. A method for providing an alert to turn front wheels toward a curb while parking on a slope, comprising:
   determining that a vehicle is on a slope;
   determining presence of a curb adjacent a side of the vehicle;
   determining that the vehicle is in park mode; and
   providing an alert to a driver to turn front wheels toward the curb when the vehicle is on a slope, adjacent the curb, and in the park mode.

2. The method according to claim 1, wherein the alert includes a chime that is output by a loudspeaker.

3. The method according to claim 2, wherein the alert includes a message that is displayed on a dashboard display.

4. The method according to claim 1, wherein the alert includes a message that is displayed on a dashboard display informing a driver to turn the front wheels toward the curb, and the method includes providing an indication to a driver when the front wheels are turned toward the curb on the dashboard display.

5. The method according to claim 1, wherein the alert includes a message on a dashboard display for turning of the front wheels toward the curb per local regulations.

6. The method according to claim 1 wherein determining the presence of the curb adjacent the vehicle is performed by at least one of vision sensors secured to opposing sides of the vehicle.

7. The method according to claim 1, wherein the determining of the presence of the curb adjacent the vehicle is performed by:
   receiving a GPS signal for determining a vehicle position,
   determining the vehicle position from the GPS signal, and
   comparing the vehicle position to a stored map to determine the presence of the curb.

8. The method according to claim 4, wherein the determining that the vehicle is on a slope is provided by an accelerometer, and wherein the slope is greater than a predetermined threshold to provide the alert.

9. The method according to claim 1, including a V2X transceiver for receiving information regarding available parking spaces in a nearby area and when the vehicle is located near to the curb.

10. A wheel orientation warning system for determining when to provide an alert to a driver of a vehicle to turn front wheels toward a curb, comprising:
    an electronic processor and a memory;
    a slope detector for detecting a slope of the vehicle;
    means for determining a presence of a curb adjacent a side of the vehicle; and
    a transmission device for detecting when the vehicle is in a park mode,
    wherein the electronic processor is configured to provide an alert to a driver to turn front wheels toward the curb when the vehicle is: at a slope with an absolute value greater than a predetermined threshold, disposed adjacent the curb, and in the park mode.

11. The warning system of claim 10, wherein the means for determining presence of the curb is at least one of vision sensors secured to opposing sides of the vehicle for detecting the curb adjacent the vehicle.

12. The warning system according to claim 10, wherein the means for determining the presence of the curb is the electronic processor receiving a GPS signal from a GPS receiver to determine a position of the vehicle and the electronic processor receiving a stored map from a cloud with a V2X transceiver or from the memory, the electronic processor comparing the position of the vehicle with the stored map to determine a presence or absence of the curb adjacent the position of the vehicle.

13. The warning system according to claim 12, wherein the V2X transceiver is configured to receive information regarding available parking spaces in a nearby area and wherein a dashboard display is configured to display the available parking spaces.

14. The warning system according to claim 10, wherein the alert includes a chime that is output by a loudspeaker.

15. The warning system according to claim 14, wherein the alert includes a message displayed on a dashboard display.

16. The warning system according to claim 10, wherein the alert includes a message displayed on a dashboard display.

17. The warning system according to claim 16, including a steering angle sensor for sensing a steering angle of the front wheels, wherein the dashboard display includes indicia showing a direction of the front wheels of the vehicle, and the electronic processor is configured to provide an indication when the wheels are turned toward the curb a sufficient amount.

18. The warning system according to claim 10, wherein the alert includes a message for turning of the front wheels toward the curb per local regulations.

19. The warning system according to claim 10, wherein the means for determining the presence of the curb adjacent the vehicle includes vision sensors provided at opposing sides of the vehicle.

* * * * *